Patented July 2, 1929.

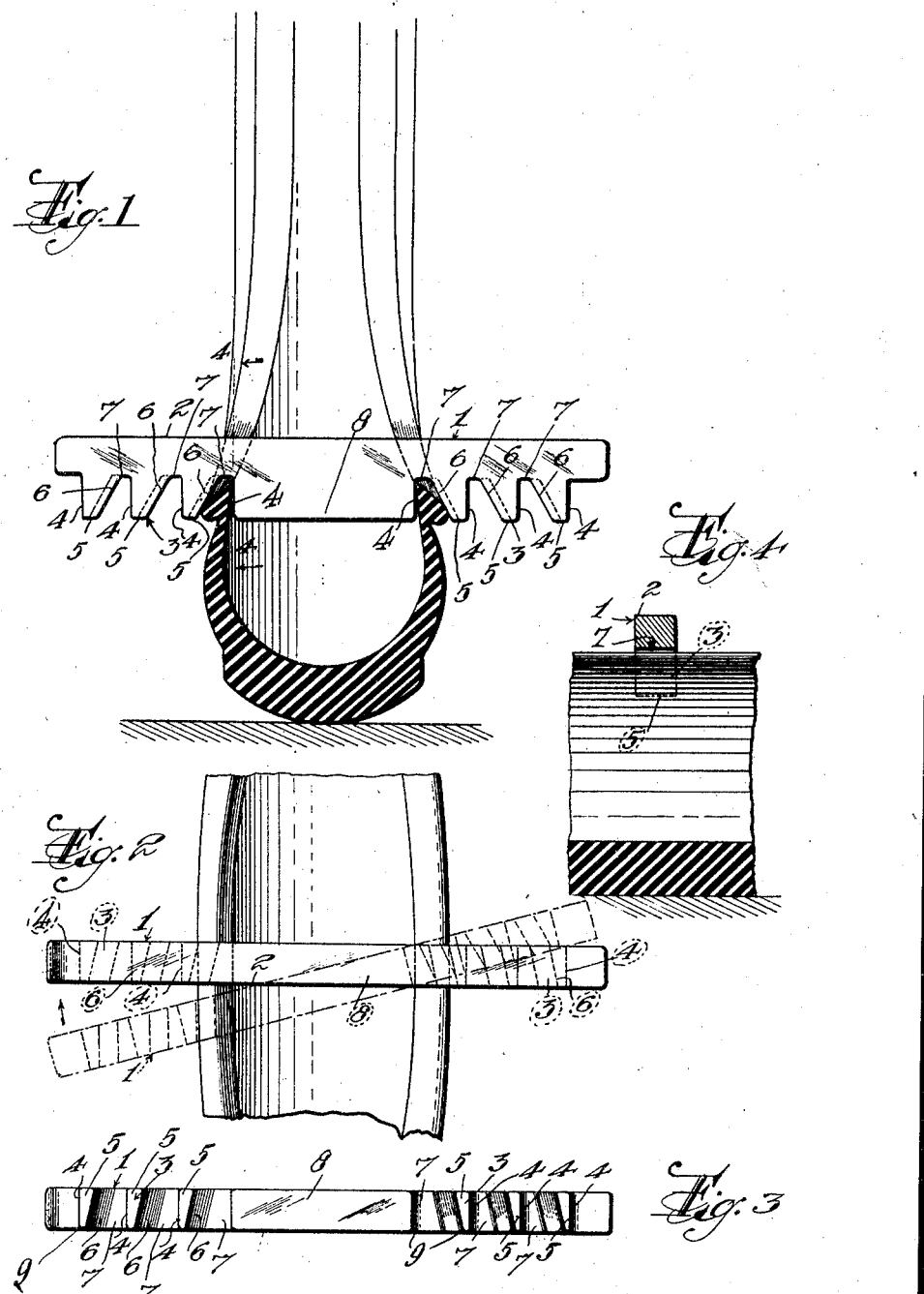

1,718,959

UNITED STATES PATENT OFFICE.

KITTY PARKER HUBBARD, OF NEWARK, NEW JERSEY.

TIRE-SPREADING TOOL.

Application filed June 20, 1928. Serial No. 286,398.

This invention relates in general to a tool for spreading the side walls of a tire to permit examination and repair of the interior of the tire.

One object of the invention is to provide a novel and improved tool of this character which is adaptable for use with various sizes of tires and can be utilized for spreading the walls of any given tire different distances apart as may be desired.

Other objects are to provide such a tool formed of one piece of sheet material and so constructed as to be easily manipulated for spreading the tire walls; to provide a tire spreading tool having at one edge thereof two series of teeth or projections, the teeth of said two series facing in opposite directions, whereby the tool may be easily and quickly slipped over the edges of the sides of the tire and obtain a firm grip thereon; to provide a tool of this character in which the teeth are so shaped as to avoid any possibility of tearing or scraping of the tire and to permit the tool to be easily slid circumferentially of the tire, and to obtain other advantages and results as will be brought out by the following description.

Referring to the accompanying drawing, in which corresponding and like parts throughout the several views are designated by the same reference characters:

Figure 1 is a side elevation of a tire tool embodying my invention showing the manner of using the same in spreading the wall of a tire.

Figure 2 is a top plan view thereof, the manner of applying the tool to the tire being shown by dot and dash lines.

Figure 3 is an edge view of the bottom of the tool, and

Figure 4 is a transverse vertical sectional view taken on the line 4—4 of Figure 1.

Specifically describing the illustrated embodiment of the invention, the reference character 1 designates a sheet or bar of suitable material, for instance aluminum, iron, etc., which preferably has one edge 2 thereof substantially straight to serve as a straight edge or a ruler. The other edge of the bar is formed with two series 3 of teeth or alternate projections and notches. Preferably the teeth or projections in each series face in opposite directions and as shown each tooth has the side 4 thereof nearest the corresponding end of the bar substantially straight and at right angles to the edge of the bar. The top 5 of each tooth is preferably straight and flush with the edge of the bar, while the rear side 6 of the tooth is inclined inwardly away from the straight side 4 and terminates in a substantially straight bottom or base 7 which separates the tooth from the next adjacent tooth. Preferably the rear side 6 of each tooth is inclined with respect to the sides of the bar to provide a clearance for applying the tool to a tire as hereinafter described. The innermost teeth of each series are merged together into one large projection 8 at the center of the bar.

In use of the tool to spread the walls of a tire, one end of the bar is grasped in one hand and the tire held in the other. The bar is then held at an angle to the axis and transversely of the tire as shown by dot and dash lines in Figure 2, and the other end of the bar is applied to the tire so that the edge of one side wall of the tire is arranged between two of the teeth 3. Thereupon the first-mentioned end of the tool is pushed downwardly to grip the edge of the other side wall of the tire between two teeth and swung by the operator about the bearing point of the second-mentioned end of the tool on the first mentioned side of the tire, which causes a spreading of the tire wall. It will be understood that the edge of the tire wall will fit between two adjacent teeth, and the inclined rear sides 6 of the teeth provide the necessary clearance for the angular placement and swinging of the tool as above described. By grasping the bar at the center, it can be easily slid circumferentially of the tire without detachment.

It will be understood from the foregoing that for different sizes of tires different teeth will be utilized, that is, for large size tires the outermost teeth will be engaged with the side walls, while for a small tire the inner teeth will be used. In a similar manner different teeth may be used for obtaining different degrees of spreading of the walls of any given tire.

Preferably all corners or edges of the tool are rounded as indicated at 9 to prevent scraping or tearing of a tire by the tool.

It will be observed that the tool is extremely simple, being formed of one piece of material and is adapted, without adjustment or modification, for use with several different sizes of tires and to provide different degrees of spreading of the tire walls. Furthermore, the tool can be easily operated by a relatively unskilled person, and is relatively small and compact so as to be easily carried in the tool case or pocket.

Having thus described my invention, what I claim is:

1. A tire spreading tool comprising a bar having a plurality of alternate recesses and projections to respectively receive and engage the side walls of a tire to hold them spread apart, the inner sides of said projections being inclined with respect to the sides of the bar to provide a clearance for applying the tool to the edges of the tire walls.

2. A tire spreading tool comprising a bar having two series of teeth, the teeth of each series having the sides thereof nearest the ends of the bar disposed at substantially right angles to the corresponding edge of the bar and the inner sides thereof inclined inwardly from the corresponding edge of the bar and away from the corresponding first-mentioned side.

3. A tire spreading tool comprising a bar having two series of teeth, the teeth of each series having the sides thereof nearest the ends of the bar disposed at substantially right angles to the corresponding edge of the bar and the inner sides thereof inclined inwardly from the corresponding edge of the bar and away from the corresponding first-mentioned side, said last-mentioned sides being also inclined with respect to the sides of the bar.

KITTY PARKER HUBBARD.